United States Patent [19]

Thomson et al.

[11] 4,274,509
[45] Jun. 23, 1981

[54] ELECTRICAL LUBRICATING APPARATUS

[75] Inventors: Ronald E. Thomson, Cambridge; Robert M. Dombroski, McFarland, both of Wis.

[73] Assignee: Madison-Kipp Corporation, Madison, Wis.

[21] Appl. No.: 69,322

[22] Filed: Aug. 24, 1979

Related U.S. Application Data

[63] Continuation-in-part of Ser. No. 909,480, May 25, 1978, abandoned.

[51] Int. Cl.³ .............................................. F16N 7/24
[52] U.S. Cl. .................................. 184/15 B; 198/500
[58] Field of Search ................ 184/15 R, 15 B, 15 A; 198/500

[56] References Cited

U.S. PATENT DOCUMENTS

| | | | |
|---|---|---|---|
| 3,031,033 | 4/1962 | Burrows | 184/15 A |
| 3,067,834 | 12/1962 | Burrows | 184/15 B |
| 3,116,810 | 1/1964 | Olson | 184/15 B |
| 3,785,456 | 1/1974 | McIntire et al. | 184/15 B X |
| 3,869,023 | 3/1975 | Thomson et al. | 184/15 A |
| 4,024,930 | 5/1977 | Thomson et al. | 184/15 B |
| 4,085,821 | 4/1978 | Kast et al. | 184/15 A |
| 4,095,674 | 6/1978 | Kido et al. | 184/15 A X |

*Primary Examiner*—David H. Brown
*Attorney, Agent, or Firm*—Merriam, Marshall & Bicknell

[57] ABSTRACT

A compact, self-contained electrical lubricating device for lubricating a movable conveyor or other system while the conveyor or system is in operation. A tank for containing a reservoir of lubricating fluid includes a coverplate to which is mounted an electric pump having inlet ports immersed in the reservoir. Electrical circuitry including a triggered constant pulse width pulse generator is housed in a control module enclosure also mounted to the coverplate. A proximity switch mounted adjacent the conveyor or other system is actuated by the travel of the conveyor past the switch to trigger the pulse generator which enables the pump causing the pump to deliver a metered shot of lubricating fluid to the conveyor through feedlines extending from the pump through the coverplate. In another embodiment, the control module enclosure is mounted on a supporting base within a compartment separate from the lubricating fluid reservoir tank. A pump is mounted on a support platform within the reservoir tank.

13 Claims, 6 Drawing Figures

ELECTRICAL LUBRICATING APPARATUS

This is a continuation-in-part of application Ser. No. 909,480, filed May 25, 1978, now abandoned.

BACKGROUND OF THE INVENTION

This invention relates generally to automatic lubricating devices and more particularly to an electrical lubricating apparatus which can lubricate a conveyor chain or other moving machinery, such as rotating machinery, etc., while the chain or machinery is in operation.

In the lubrication of such machinery, it is important that the lubricating apparatus be able to provide a clean shot of lubricating fluid on a particular part of a conveyor as the chain travels past the lubricating station in the course of the conveyor operation. The lubricating apparatus should provide what is known as a clean shot which is a repeatable solid amount of fluid of predetermined volume independent of external factors such as variations in chain speed.

Various devices are presently in use for applying a clean shot of lubricating fluid on a particular part of a conveyor as the chain travels past the lubricating station in the course of the conveyor operation. For example, reference may be made to the co-pending U.S. patent application, Ser. No. 31,154, filed May 5, 1979, of R. E. Thomson, et al., assigned to the same assignee herein, which describes a pneumatically actuated device for delivering a clean shot of lubricating fluid. The device illustrated therein employs a tank for containing a reservoir of lubricating fluid such as oil and includes a pneumatically operated pump mounted on the bottom side of the tank coverplate. When installed, the pump resides in the tank and is immersed in the lubricating fluid. An air valve trip device is mounted to contact and be actuated by the conveyor system to be lubricated. The trip device is pneumatically coupled to the pump through a manifold to enable the pump to deliver clean shots of lubricating fluid to the conveyor through feed lines extending from the manifold. That apparatus does, however, require a source of pressurized air which in many industrial application may not be readily available.

While the lubricating device illustrated in the aforementioned application, as well as others presently in use, operate entirely satisfactorily for the purpose intended, it is desirable to provide a compact, self-contained unit which does not require a compressed air source, but one which utilizes a common source of 110 volt, 60 Hz. AC power. Further, it is desirable to minimize the number of working components exposed to the environment in which the machinery to be lubricated is found. That is, the electrical and mechanical components should be shielded from dust, dirt and other debris commonly found in industrial applications. Moreover, it is desirable to provide a lubricating apparatus which does not contact the conveyor chain and which, therefore, is not susceptible to wear or mechanical breakdown as a result of continuous contact with the chain.

SUMMARY OF THE INVENTION

In accordance with the principles of the present invention, there is provided a compact, self-contained, electrical lubricating apparatus for a moving conveyor system which requires only a minimum of external connections at the lubricating site in order to install and operate the apparatus. In particular, installation of the lubricating apparatus of the present invention can be accomplished by merely positioning a proximity switch near the conveyor chain, routing the desired number of lubricating lines to the required lubricating stations, and connecting a source of electrical power to the apparatus.

The electrical lubricating apparatus, in accordance with the present invention, includes a tank for containing a reservoir of lubricating fluid. A pump having inlet ports immersible in the lubricating fluid is mounted within the tank. Feed lines or conduits interconnecting the output ports of the pump and bulkhead fittings through the tank deliver shots of lubricating fluid to the output feed lines extending to the lubricating stations at the conveyor. Electrical circuitry including a triggered constant pulse width pulse generator is housed in a control module enclosure mounted to the underside of the tank coverplate and immersible in the reservoir of lubricating fluid. In another embodiment the control module is mounted within a compartment separate from the reservoir tank.

The pulse generator, responsive to triggering pulses from a non-contact proximity switch located adjacent the conveyor, produces a constant pulse width pulse which is coupled to the pump, causing the pump to deliver a metered shot of lubricating fluid to the conveyor. Check valves are provided at the input and output ports of the pump to prevent reverse flow of the lubricating fluid in the system. The pump includes a solenoid coupled to the pulse generator for forcing piston rods downwardly in passageways in the pump to force the lubricating fluid out of the pump through the output ports. When the solenoid is thereafter disabled during the lubricating cycle, the piston rods are released to draw the next charge of lubricating fluid into the pump. Accordingly, the electrical lubricating apparatus of the present invention is compact, self-contained, readily installed and reliably protected from the possibly destructive effects of any corrosive or dirty environment in which it may be installed while still being readily accessible for maintenance.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

DETAILED DESCRIPTION

Figure 1:
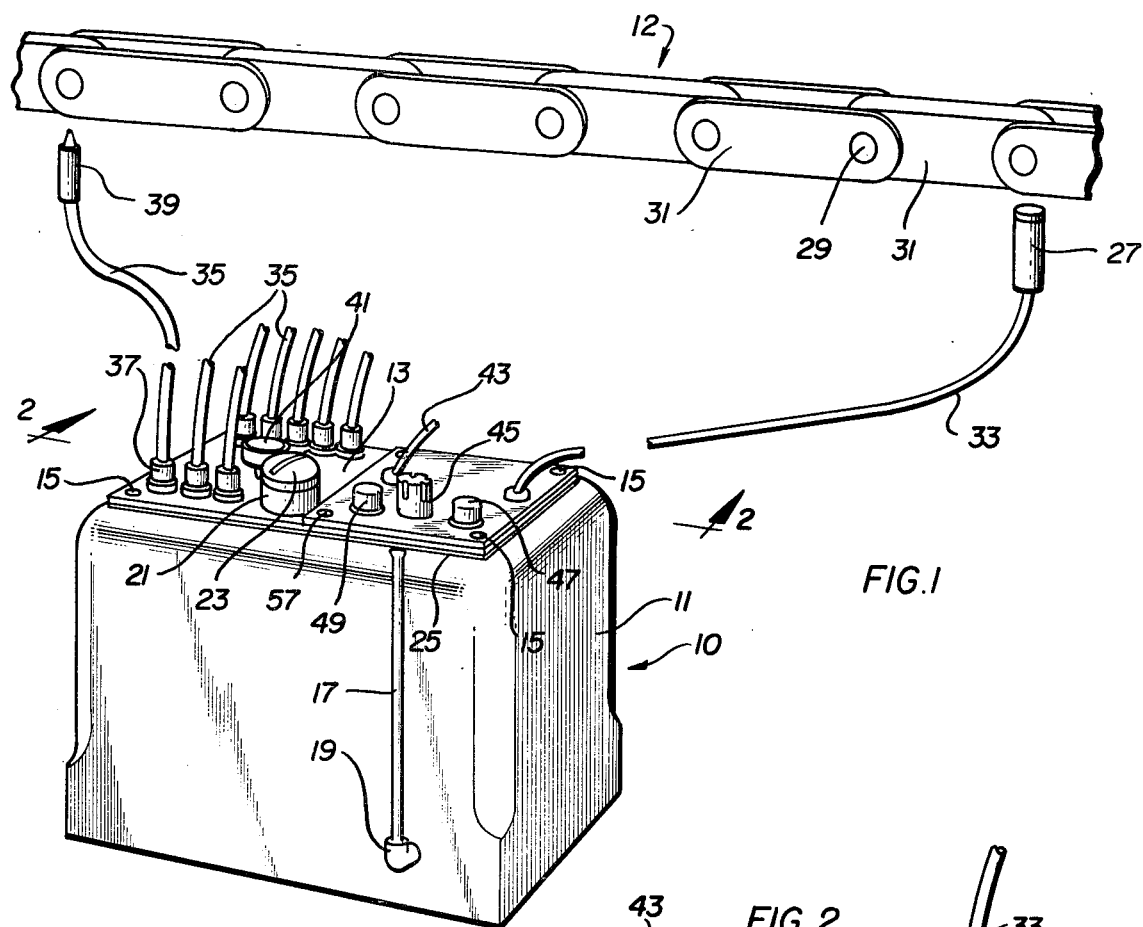
FIG. 1 is a perspective view illustrating an embodiment of the electrical lubricating apparatus of the present invention and showing the interconnection and installation of the lubricating apparatus relative to a conveyor chain.

Referring now to FIG. 1, the electrical lubricating apparatus, identified generally at 10, comprises a tank 11 containing a reservoir of a lubricating fluid, such as oil, used in lubricating, for example, a movable conveyor chain 12 or the like. The tank 11 is open at its top end, but at all times when the apparatus is operative the open top end of the tank is closed by a coverplate 13 secured to the tank by a plurality of screws 15. A clear, plastic sight gauge 17 extends upwardly outside the tank 11 from a tubular elbow connector 19 opening to the interior of the tank 11. Accordingly, a column of the fluid rises in the sight gauge 17 to provide a visual indication of the level of the lubricating fluid reservoir in the tank 11, the height of the column of lubricating fluid in the sight gauge corresponding to the level of the lubricating fluid in the tank. When the reservoir of lubricating fluid is depleted, the tank 11 can be refilled through a tubular port 21 in the tank coverplate 13. A removable cap 23 threadably engages the port 21 to seal the port and prevent dust and other materials from entering the tank 11 and contaminating the reservoir of lubricating fluid. A gasket 25 is placed intermediate the lip of tank and the coverplate 13 to provide a fluid seal.

The apparatus further includes a non-contact proximity switch 27 which is positioned on-line with the conveyor chain 12 and spaced therefrom so there is no physical contact between the chain and the proximity switch when the electrical lubricating apparatus is installed and in place. The proximity switch 27, for example, may be located below the conveyor chain 12 so that each time a pivot pin 29 connecting adjacent links 31 of the chain passes overhead the proximity switch delivers a pulse to the electrical lubricating apparatus via an electrical cable 33. Alternatively, the proximity switch 27 can be relocated to be triggered by the passage of a trolley or the like. Responsive to the pulses from the proximity switch 27, the apparatus is enabled to deliver a metered shot of lubricating fluid through output conduits or feedlines 35 to the conveyor chain 12. In the present embodiment, eight lines are provided. Each of the output feedlines 35 is coupled to a bulkhead fitting 37 extending through the coverplate 13, and each line 35 has a nozzle 39 at its discharge end which is positioned adjacent the conveyor 12 at a corresponding lubrication station to deliver the metered shots of lubricating fluid to the conveyor. A flow adjustment screw 41 permits the amount of lubricating fluid applied to the conveyor 12 during each shot to be varied according to the lubricating needs of the system being lubricated.

The apparatus 10 derives its operating power from an electrical power source, e.g., 110 volt AC, 60 Hz, line voltage, coupled to the apparatus by a power cord 43. A fuse holder 45 is provided to mount a fuse coupled to the power cord to protect the electrical apparatus against overloading. A green indicator light 47 lights when electrical power is coupled to the apparatus, and a red indicator light 49 lights responsive to the lubricating fluid level in the tank 11 dropping to a minimal level whereupon the apparatus is disabled until the tank is refilled.

Figure 2:
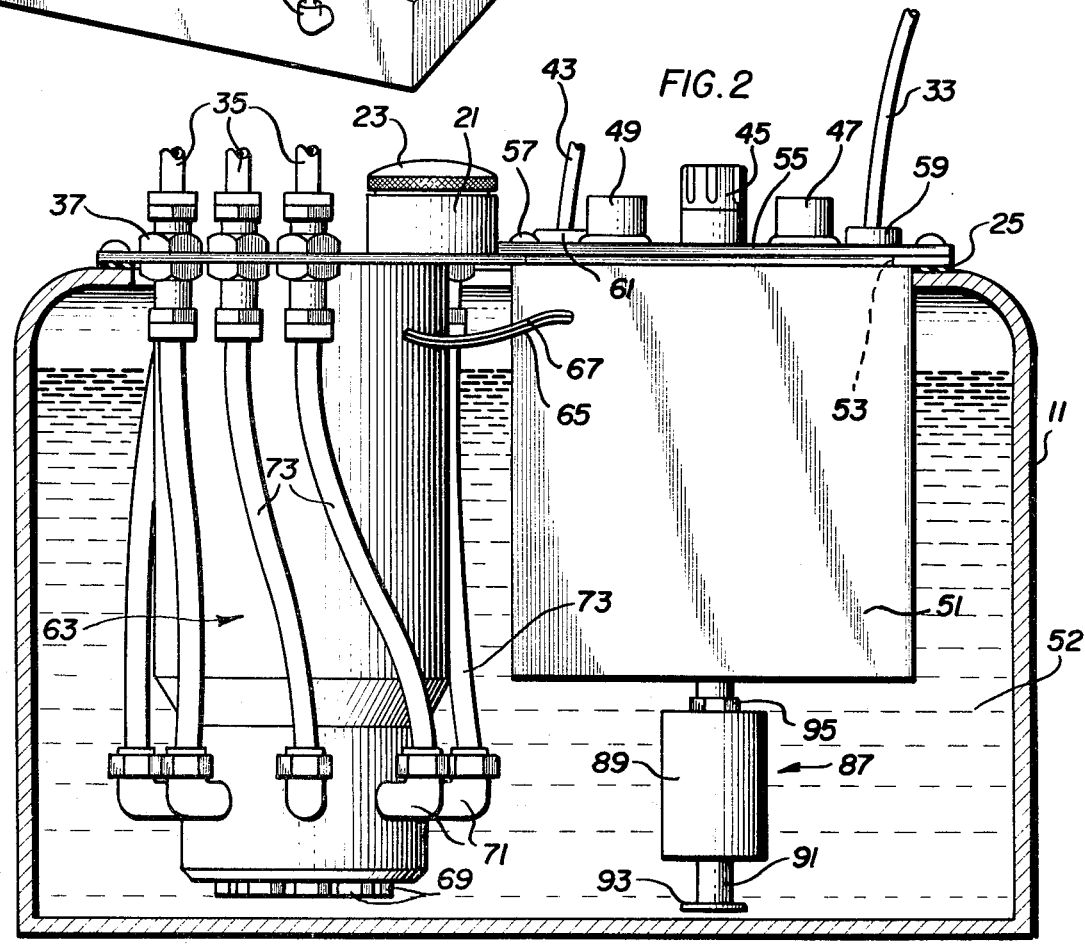
FIG. 2 is a sectional view of the tank taken along lines 2—2 in FIG. 1 illustrating the various components of the apparatus mounted within the tank.

In FIG. 2, the apparatus is seen to further include a sealed control module enclosure 51 which is secured, such as by welding, to the underside of the coverplate 13 and, accordingly, immersed in the lubricating fluid reservoir 52 in the tank 11. The control module enclosure 51 houses electrical components comprising the electrical portion of the apparatus 10. Access to the interior of the control module enclosure 51 and the electrical components is provided by a rectangular opening 53 in the coverplate 13 immediately above the enclosure. A second coverplate 55 closes the opening 53 in the tank coverplate 13 to seal the enclosure and is held in place by screws 57. The cable 33 from the proximity switch and the power cord 43 pass through rubber grommets 59 and 61, respectively, in the plate 55 to connect to the electrical circuitry housed in the enclosure. The fuse holder 45 and the indicator lights 47 and 49 are mounted on the top side of the plate 55 and extend therethrough to connect to the electrical circuitry in the enclosure.

A pump 63 is mounted to the underside of the coverplate 13 such that when the coverplate is assembled to the tank 11, the pump is also immersed in the reservoir of lubricating fluid 52. A pair of insulated wires 65 and 67 extend between the enclosure 51 and the pump 63 above the lubricating fluid to connect the pump to the electrical circuitry which periodically enables the pump responsive to the pulses from the proximity switch 27. In operation, the electrical circuitry housed in the enclosure 51 on the underside of the tank coverplate periodically enables the pump 63 to deliver clean shots of lubricating fluid to the conveyor 12, the lubricating fluid 52 being drawn into the pump 63 through input ports 69 at the bottom of the pump and output through output ports arranged around the perphiery of the pump. Elbow fittings 71 couple the output ports to feedlines 73 coupled to the bulkhead fittings 37 to direct metered shots of lubricating fluid to the system being lubricated through the output feedlines 35. In the present embodiment, eight output feedlines are provided.

Figure 3:
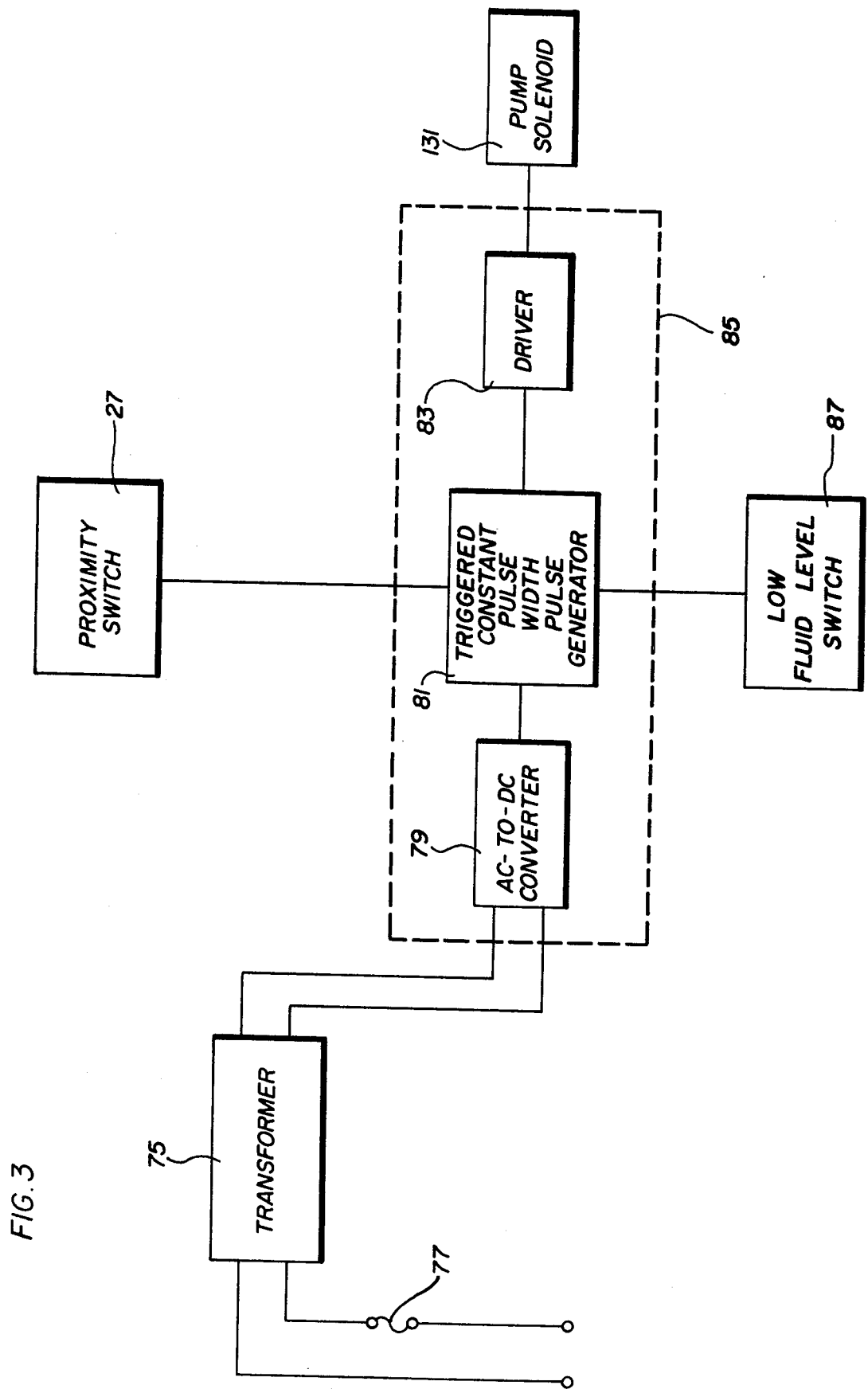
FIG. 3 is a schematic block diagram illustrating the interconnection of the components comprising the electrical circuitry of the lubricating apparatus.

With reference now to FIG. 3, the electrical circuitry utilized to selectively enable the pump to meter shots of lubricating fluid from the apparatus to the conveyor system is shown. In particular, the 110 volt AC electrical power is coupled to the input terminals of a transformer 75 which steps down the AC voltage to a lower AC voltage level. The fuse 77 contained in the fuse holder 45 is interposed in the line between the 110 volt AC source and tne transformer 75 to protect against overloading of the electrical circuits. The output terminals of the step-down transformer 75 are coupled to an AC-to-DC power converter 79 wherein the AC voltage from the step-down transformer is converted to a low-level DC voltage, e.g., in the order of 24 volts DC. The low-level DC voltage from the power converter 79 is then coupled to a constant pulse width pulse generator circuit 81 to supply DC operating and bias voltages to the pulse generator. The proximity switch 27 is coupled to the pulse generator 81 by the cable 33 and provides input trigger pulses thereto. More particularly, as the conveyor chain 12 moves pass the proximity switch, the switch 27 is triggered, for example, by the link pivot pin 29, and responsive thereto generates a short pulse. The pulse generator 81 is triggered by the leading edges of successive pulses from the switch 27 and, upon being triggered, generates a corresponding constant pulse width output pulse. The output pulses from the pulse generator 81 are coupled to a driver circuit 83 which amplifies the low current output pulses to a level suitable for driving the pump 63. Accordingly, when the constant width output pulses are coupled through the driver 83 to the pump, the pump 63 is enabled for a precise time interval to deliver a metered shot, e.g., 0.001 to 0.002 cubic inches, of lubricating fluid to the conveyor 12.

The AC-to-DC converter 79, the triggered constant pulse width pulse generator 81, and the driver 83 are mounted on a single circuit board, shown by dashed line 85 in FIG. 3, which is housed within the enclosure 51 adjacent to the step-down transformer 75, the outputs of the driver 83 being coupled to the pump 63 by the wires 65 and 67. The circuit board 85 may be encapsulated to further seal the electrical circuits and protect them from moisture, dust and other contaminants which may otherwise find their way into the enclosure 51.

A low fluid level switch 87 is also coupled to the pulse generator 81 and is effective to disable the pulse generator when the level of lubricating fluid 52 in the tank 11 falls below or reaches a certain predetermined minimum level. The red indicator light 49 is coupled to be responsive to the low fluid level switch 87 and lights whenever the lubricating fluid level reaches the minimum level. The low fluid level switch 87, shown in greater detail in FIG. 2, comprises a float 89 which rises and falls on a stem 91 extending downwardly from the bottom wall of the enclosure 51. As the lubricating fluid level drops in the tank 11 during operation of the electrical lubricating apparatus, the float 89 moves downwardly on the stem 91 whereas it rises when the tank is refilled. A clip 93 at the bottom end of the stem 91 limits the downward travel of the float 89 and a stop nut 95 adjacent the upper end of the stem limits its upward travel. When the lubricating fluid level in the tank 11 is insufficient for continued operation, the fluid level switch 87 disables the pulse generator 81 responsive to the float 89 moving downwardly to the predetermined minimum fluid level.

Figure 4:
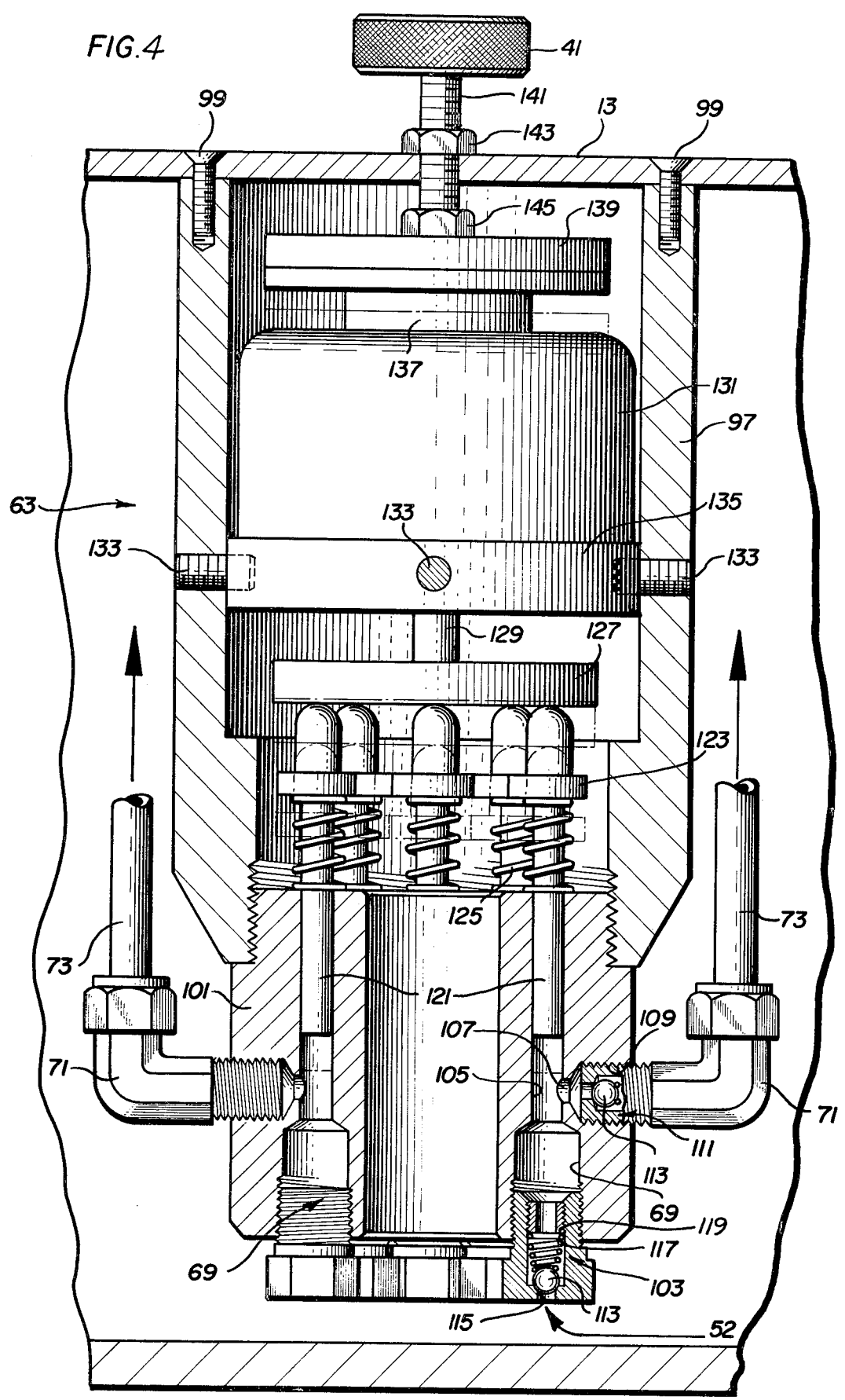
FIG. 4 is a fragmentary sectional view of the pump illustrating the construction and operation thereof.

With reference now to FIG. 4, the pump 63 comprises a hollow, tubular housing 97 fastened to the underside of the coverplate 13, for example, by a plurality of screws 99. The bottom end of the housing 97 is threaded on its interior surface to engage and secure a correspondingly threaded manifold 101 at the bottom end of the housing. The input ports 69 through which the lubricating fluid 52 is drawn from the tank 11 and into the pump 63 are located at the bottom end of the manifold 101 where check valves 103 threadably engage the correspondingly threaded input port openings 69. Each of the input ports 69 communicates with a corresponding tubular passageway 105 extending upwardly from the input ports within the wall of the manifold 101 and opening to the interior of the pump housing 97. Short lateral passageways 107 connect each of the vertical passageways 105 to a corresponding one of the output ports 109 where the elbow fitting 71 threadably engages the port. Each of the elbow fittings houses a check valve 111. At the other end of each of the elbow fittings 71, the attached feedline 73 runs to a corresponding one of the bulkhead fittings 37.

Each of the check valves 103 and 111 includes a ball member 113 which is resiliently pressed against a smaller diameter opening 115 in end of the check valve by a helical spring 117 positioned against an interior shoulder 119 of the check valve. The ball member 113 closes the opening 115 to block reverse flow of the lubricating fluid 52 through the valve, i.e., out the valve through the opening 115, but is forced away from the opening against the bias of the spring 117 to permit flow in the forward direction. As illustrated in FIG. 4, the input port check valves 103 allow the lubricating fluid to be drawn into the pump 63, but once in the pump the lubricating fluid 52 cannot escape from the pump through the valves 103. Similarly, the output port check valves 111 are installed so that lubricating fluid 52 can exit through the feedlines 73 but cannot be drawn into the pump 63 from the feedlines.

A piston rod 121 is located in each of the vertical passageways 105 in the manifold wall and is sized to slide therein. The top end of each piston rod 121 extends from the top of the manifold 101 into the chamber above the manifold defined by the pump housing 97. A circular flange 123 is provided at the top end of each piston rod 121, and a helical spring 125 encircling the piston rod is positioned between the top of the manifold 101 and the bottom of the flange 123. The travel of the piston rod 121 in the upward direction is limited by a circular plate 127 attached to the bottom end of a shaft 129 extending from a solenoid 131 mounted in the housing 97 above the manifold 101. The solenoid 131 is secured in position in the housing 97 by a plurality of set screws 133 extending through the wall of the pump housing 97 and into the solenoid mounting plate 135. The core 137 of the solenoid is forced downwardly from its normally upward position responsive to the solenoid 131 being actuated by a constant pulse width pulse from the pulse generator 81. The upward travel of the core 137 is limited by a circular adjustment plate 139 secured to the bottom end of a screw 141 extending through the tank coverplate 13 and to which the flow adjustment knob 41 is affixed. A nut 143 secured to the top of the coverplate 13 provides a corresponding threaded member for engaging the screw 141, and accordingly, as the flow adjustment knob 41 is turned, the screw 141 moves upward or downward in the vertical direction to raise and lower the plate 139. A nut 145 fastens the adjustment plate to the bottom end of the screw.

In operation, the core 137 of the solenoid resides against the bottom surface of the adjustment plate 139 when the solenoid 131 is not driven, and the bottom plate 127 is raised to its maximum level, permitting the piston rod 121 to assume their uppermost positions in the manifold passageways 105. When the solenoid 131 is enabled by the pulse generator 81, the core 137 is drawn downwardly in the solenoid to force the plate 127 down against the tops of the piston rods 121 such that the piston rods are pushed down into the manifold passages 105 against the opposing influence of the helical springs, 125 as illustrated in ghost in FIG. 4, and apply pressure to the lubricating fluid 52 in the manifold passageways 105 and 107. As pressure is applied to the lubricating fluid, the input port check valves 103 close to prevent the escape of the lubricating fluid into the tank 11, and accordingly, the lubricating fluid is forced into the feedlines 73 through the output port check valves 111. Accordingly, when the solenoid 131 is enabled, metered shots of lubricating fluid are delivered through the feedlines 35 and nozzles 39 to the conveyor 12 or such other system. Immediately after the metered shots have been delivered, the solenoid 131 is disabled and the core 137 moves upwardly to contact the bottom surface of the adjustment plate 139. Thus released, the piston rod springs 125 push the piston rods 121 upwardly against the bottom plate 127 and the piston rods rise in the manifold passageways 105, the check valves 111 in the output ports 109 preventing the lubricating fluid in the feedlines 73 from being drawn into the pump. Rather, lubricating fluid from the tank 11 is drawn into the pump 63 through the input port check valves 103 to recharge the pump. When the solenoid 131 is thereafter again enabled, the piston rods 121 force the next shot of lubricating fluid out through the feedlines 73. The amount of lubricating fluid applied to the conveyor by each feedline 35 during a single shot is determined by the travel of the piston rods 121 as limited by the adjustment knob 41. Thus, when the adjustment plate 139 is raised by means of the knob 41, the upward travel of the piston rods is increased and the bottom ends of the piston rods moves to a point higher than that shown in FIG. 4 when the solenoid core 137 is released. Accordingly, when the solenoid 131 is thereafter enabled a larger shot of lubricating fluid is metered through the feedlines 73. Similarly, when the adjustment knob 41 is adjusted to lower the plates 129 and 139, a smaller metered shot is delivered.

Accordingly, the electrical lubricating apparatus of the present invention consistently delivers precisely metered shots of lubricating fluid to a conveyor 12 or system which is to be lubricated irrespective of the speed at which the conveyor chain is moving. Because the pulse generator 81 delivers constant pulse width pulses to the solenoid of the pump, the solenoid 131 is enabled for the same time interval regardless of the speed of the conveyor chain and the solenoid will not be prematurely disabled as the conveyor chain speeds up or slows down. Thus, the electrical lubricating apparatus of the present invention eliminates the possibility of the solenoid being prematurely disabled, resulting in a short shot of lubricating fluid being applied to the conveyor. Similarly, if the conveyor chain breaks down or stalls, the apparatus prevents excessive amounts of lubricating fluid from being applied to the chain.

Figure 5:
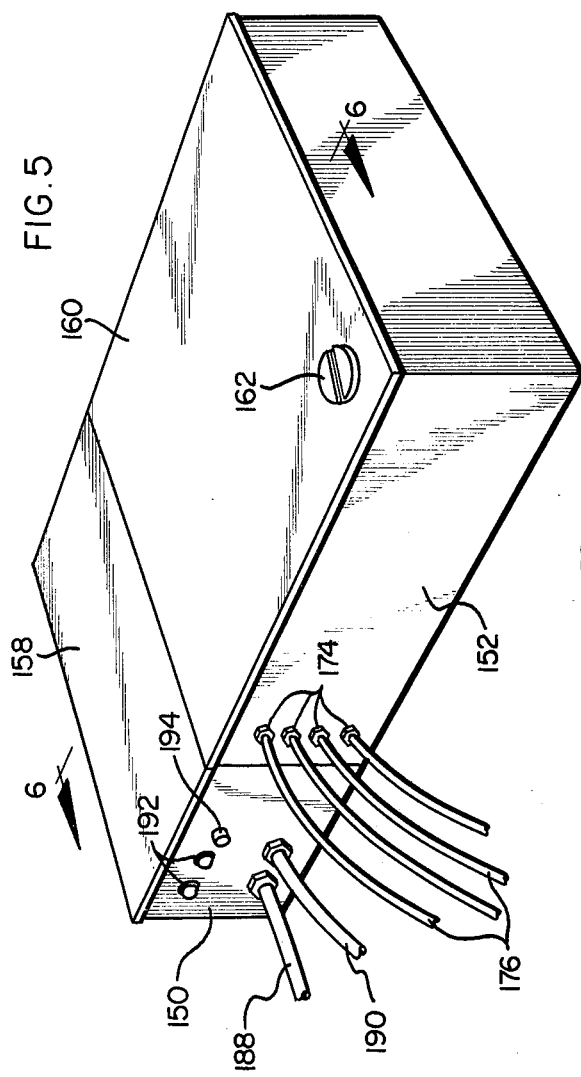
FIG. 5 is a perspective view illustrating another embodiment wherein the control module containing the electrical circuitry is mounted within a compartment separate from the reservoir tank.
Figure 6:
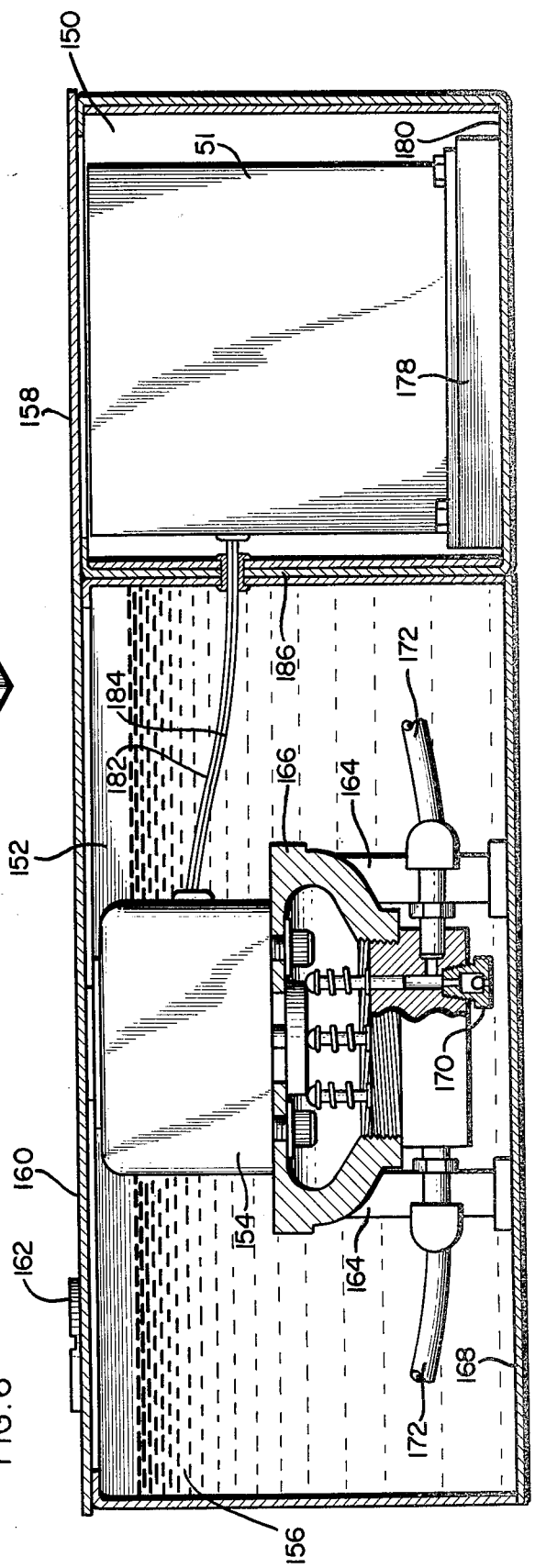
FIG. 6 is a sectional view taken along section line 6—6 of FIG. 5.

Referring now to FIGS. 5 and 6, there is illustrated an alternative embodiment of the invention wherein the control module enclosure 51 is mounted in a compartment 150 which is separate from the reservoir 152 containing a lubricating pump 154 and a supply of lubricating fluid 156. Separate coverplates 158 and 160 respectively, seal the top of the reservoir 152 and the top of the separate compartment 150. A cap 162 threadably mounts within an aperture in coverplate 160 and can be removed for adding lubricating fluid 156 into the reservoir.

Pump 154 is similar in its operating components as pump 63 to deliver metered shots of lubricating fluid in response to constant pulse width pulses. Note that in this embodiment rather than suspending the components from the coverplate, as in the embodiment of FIGS. 1-4, mounting posts 164 extend downwardly from the pump mounting frame 166 to engage the reservoir floor 168. Pump inlet 170 is thus disposed slightly above the floor 168 to admit a quantity of lubricating fluid through a suitable check valve for dispensing via output feed lines 172. A plurality of feed lines 172 are coupled to respective bulkhead fittings 174 for connection to a respective plurality of output conduits 176. It is understood, of course, that each of the conduit lines 176 is coupled to a respective nozzle, such as the nozzle 39 shown in FIG. 1.

As can be seen from FIG. 6, control module 51, rather than being mounted to depend from the coverplate, is instead mounted on a mounting base 178 resting on the floor 180 of compartment 150. A pair of insulated wires 182 and 184 extend between the control module 51 in compartment 150, through a suitable sealed aperture in common wall 186 to connect the pump 154 to the electrical circuitry within the control module. This periodically enables the pump to be responsive to the pulses from a proximity switch similar to the proximity switch 27 shown in FIG. 1. It is understood, of course, that the control module 51 incorporates the same circuit as the enclosure 51 shown in FIG. 2 and as previously described in connection with the embodiment of FIGS. 1-4. The input power to the control module 51 is coupled through cable 188. Another cable 190 is provided for coupling the signals from a proximity switch such as the proximity switch 27 in FIG. 1 to the control module 51 within compartment 150. A pair of indicator lights 192 are provided for displaying the system status and a fuse 194 supplies protection for the electrical components. Thus the indicator lights 192 and fuse 194 are connected by suitable leads (not shown) to the electrical circuitry within control module 51.

While the control module 51 is mounted within compartment 150 which is separate but adjacent to the reservoir 152, in some circumstances it may be desirable to locate compartment 150 even more remotely from reservoir 152. In such a case, the pair of insulating wires 182 and 184 would be of sufficient length to interconnect pump 154 in reservoir 152 with the control module 51 located in a remotely placed compartment 150. In either event, the components are contained within sealed, dust-free enclosures which may be readily installed and yet are readily accessible for maintenance of the components contained therewithin.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

We claim:

1. Electrical lubricating apparatus for applying shots of lubricating fluid to a movable mechanical system, said electrical lubricating apparatus comprising:
    a tank for containing a reservoir of said lubricating fluid;
    a cover for closing said tank;
    a pump having inlet means for receiving lubricating fluid and outlet means for dispensing shots of lubricating fluid,
    said pump being mounted to extend within said tank with said pump inlet means immersible within said reservoir of lubricating fluid;
    means including at least one conduit line coupled to said pump outlet means and having discharge ends located adjacent said movable mechanical system;
    means including a proximity switch positioned adjacent said movable mechanical system for generating electrical pulses responsive to the movement of said mechanical system past said proximity switch;
    an enclosure mounted to extend within said tank and be immersible within said reservoir of lubricating fluid; and
    means including an electrical pulse generator housed in said enclosure and coupled to said proximity switch, said pulse generator being triggered by said pulses from said proximity switch to generate constant pulse width pulses, said constant pulse width pulses being coupled to said pump and enabling said pump to deliver shots of lubricating fluid through said conduit lines to said movable mechanical system each time said proximity switch triggers said pulse generator.

2. Electrical lubricating apparatus according to claim 1, wherein said apparatus is coupled to an alternating current (AC) electrical power source, said electrical lubricating apparatus further including a transformer coupled to said AC electrical power source for stepping down the voltage level of said AC electrical power and AC-to-DC converter means for converting said stepped down AC electrical power to direct current (DC) electrical power, said pulse generator being coupled to said AC-to-DC converter and being biased and operated by said DC electrical voltage, said transformer and said AC-to-DC converter being housed in said enclosure.

3. Electrical lubricating apparatus according to claim 1, including a low fluid level switch located in said tank to be immersible in said reservoir of lubricating fluid, said low fluid level switch being coupled to said pulse generator for disabling said pulse generator responsive to the level of said lubricating fluid in said tank being reduced to a predetermined minimum level.

4. Electrical lubricating apparatus according to claim 1, including means for respectively mounting said pump and said enclosure to said cover to extend within said tank.

5. Electrical lubricating apparatus according to claim 1, wherein said pump comprises a tubular housing secured to said cover and a manifold mounted to the bottom end of said housing, said manifold having at least one vertical passageway communicating with said inlet means and the interior of said housing and a lateral passageway connecting said vertical passageway to said outlet means, said inlet means and said outlet means having check valves permitting said lubricating fluid to enter through said inlet means and exit through said outlet means but blocking reverse flow of said lubricating fluid, said pump further including piston rods slidably engaging each of said vertical passageways and a solenoid mounted in said housing but spaced from said manifold, said solenoid including a core having a circular plate extending from said core between said solenoid and said piston rods, said piston rods having means for biasing said piston rods against said plate, said solenoid being coupled to said pulse generator and said core being moved downward responsive to said constant pulse width pulses to force said piston rods farther into said vertical passageways to force a shot of said lubricating fluid into said conduit lines, said piston rods being released to draw lubricating fluid into said vertical passageways through said inlet means when said solenoid is not being electrified by pulses from said pulse generator, and including means for adjusting the position of said plate in said housing to vary the amount of said lubricating fluid discharged during each cycle of said pump.

6. Electrical lubricating apparatus according to claim 5, including driver means for amplifying said constant pulse width pulses from said pulse generator and coupling said amplified constant pulse width pulses to said solenoid to drive said pump.

7. Electrical lubricating apparatus for applying shots of lubricating fluid to a movable mechanical system, said electrical lubricating apparatus comprising:

a tank for containing a reservoir of said lubricating fluid;

a cover for closing said tank;

a pump having inlet means for receiving lubricating fluid and outlet means for dispensing shots of lubricating fluid, said pump being mounted to extend within said tank with said pump inlet means immersible within said reservoir of lubricating fluid;

means including at least one conduit line coupled to said pump outlet means and having discharge ends located adjacent said movable mechanical system;

means including a proximity switch positioned adjacent said movable mechanical system for generating electrical pulses responsive to the movement of said mechanical system past said proximity switch; and control module means including an electrical pulse generator coupled to said proximity switch, said pulse generator being triggered by said pulses from said proximity switch to generate constant pulse width pulses, said constant pulse width pulses being coupled to said pump and enabling said pump to deliver shots of lubricating fluid through said conduit lines to said movable mechanical system each time said proximity switch triggers said pulse generator.

8. Electrical lubricating apparatus according to claim 7, including a sealable compartment and means for mounting said control module means within said sealable compartment.

9. Electrical lubricating apparatus according to claim 8, including means mounting said sealable compartment adjacent said tank.

10. Electrical lubricating apparatus according to claim 9, wherein said sealable compartment and said tank share a common wall.

11. In electrical lubricating apparatus for applying shots of lubricating fluid to a movable mechanical system, including a pump for receiving lubricating fluid and dispensing shots of lubricating fluid through at least one conduit line to said movable mechanical system in response to sensing means sensing the movement of said mechanical system, the improvement comprising:

said sensing means including trigger means for generating electrical trigger pulses responsive to said sensing means sensing the movement of said mechanical system; and an electrical constant pulse width generator coupled to said trigger means, said constant pulse width generator being triggered by said trigger pulses to generate constant pulse width pulses, said constant pulse width pulses being coupled to said pump and enabling said pump to deliver metered shots of lubricating fluid to said movable mechanical system for a precise time interval corresponding to said constant pulse width.

12. The improvement of claim 11, including driver means for amplifying said constant pulse width pulses from said pulse generator and coupling said amplified constant pulse width pulses to said pump.

13. The improvement of claim 12, wherein said pump includes a solenoid actuable by said amplified constant pulse width pulses from said driver means.

* * * * *